Jan. 7, 1930. C. T. HIBBARD 1,742,593
SWITCH MECHANISM FOR SYNCHRONOUS MOTOR STARTING SYSTEMS
Filed April 27, 1926 4 Sheets-Sheet 1

INVENTOR
Charles Truman Hibbard
BY
ATTORNEYS

Jan. 7, 1930.  C. T. HIBBARD  1,742,593
SWITCH MECHANISM FOR SYNCHRONOUS MOTOR STARTING SYSTEMS
Filed April 27, 1926  4 Sheets-Sheet 2
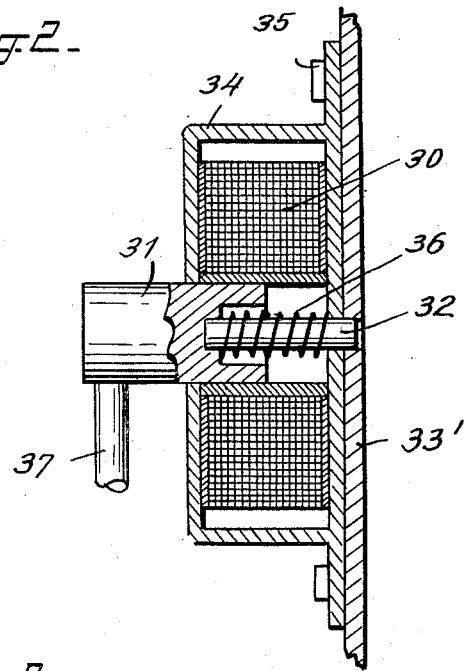
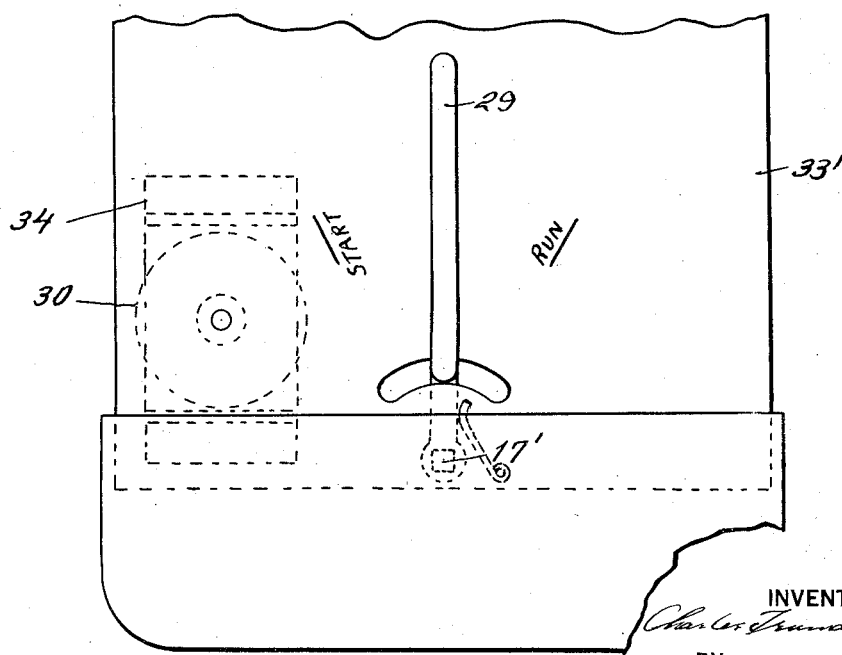
INVENTOR
Charles Truman Hibbard
BY
Pennie Davis Marvin & Edmonds
ATTORNEYS Jan. 7, 1930.    C. T. HIBBARD    1,742,593
SWITCH MECHANISM FOR SYNCHRONOUS MOTOR STARTING SYSTEMS
Filed April 27, 1926    4 Sheets-Sheet 3
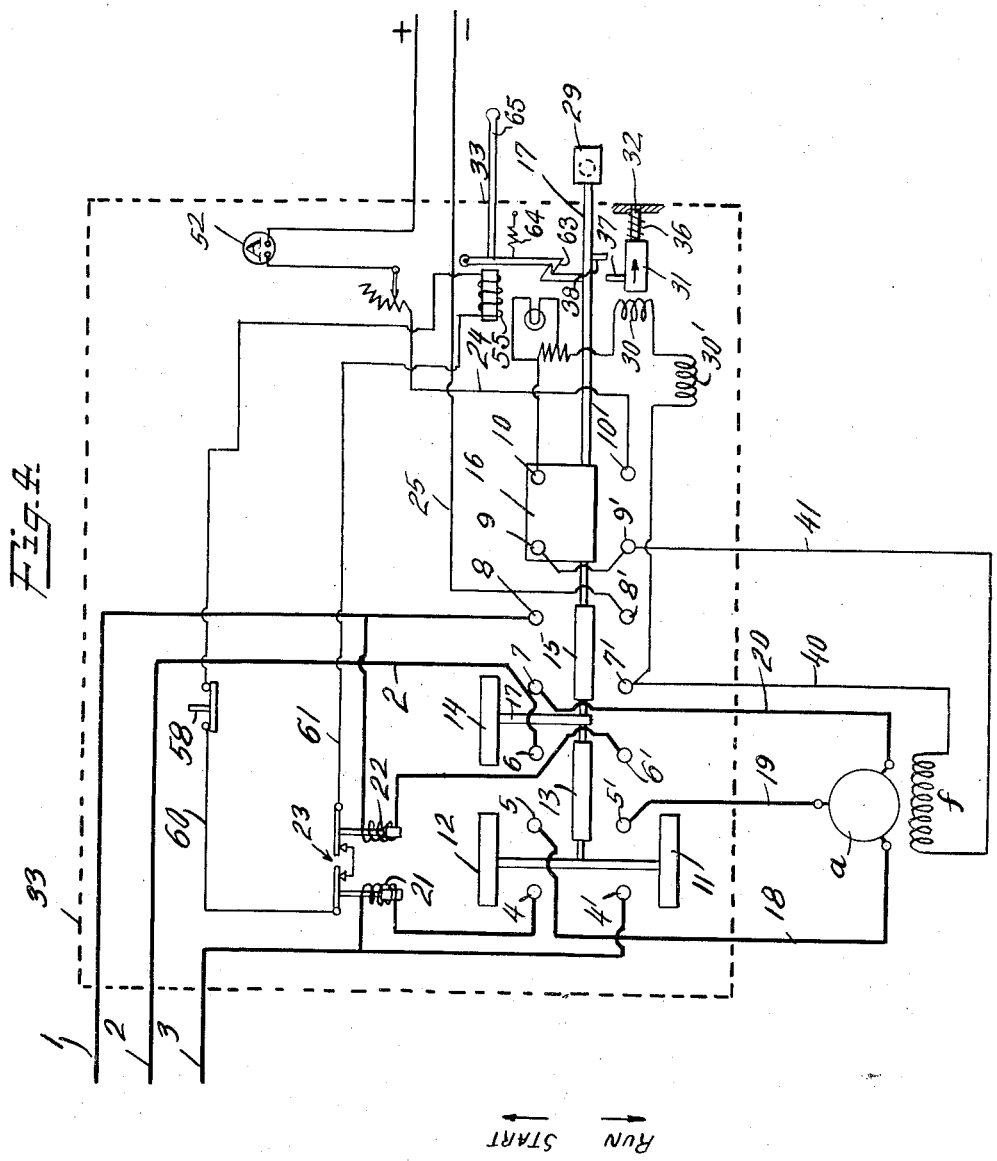

Jan. 7, 1930.                C. T. HIBBARD                1,742,593
          SWITCH MECHANISM FOR SYNCHRONOUS MOTOR STARTING SYSTEMS
                    Filed April 27, 1926        4 Sheets-Sheet 4
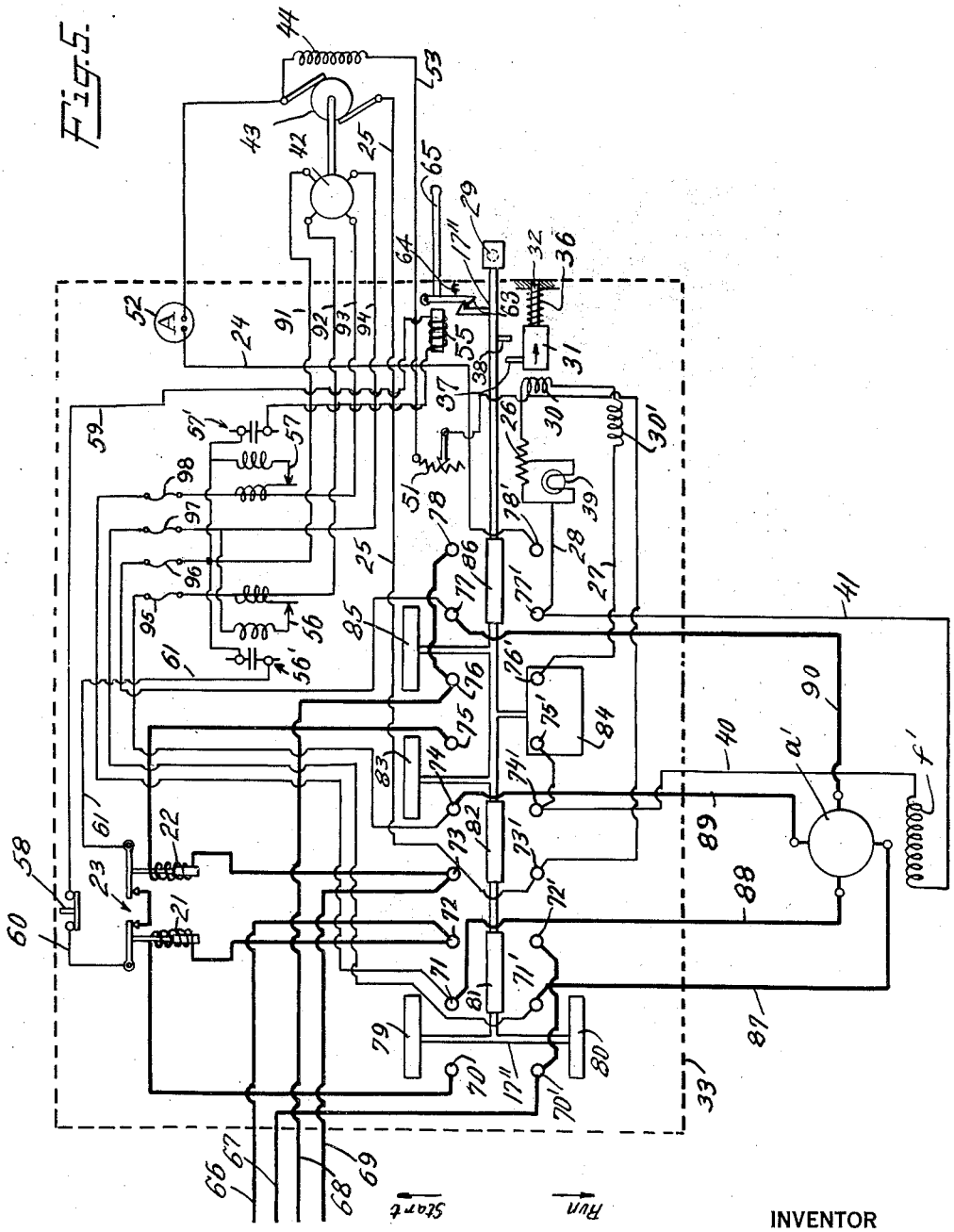
INVENTOR
Charles Truman Hibbard
BY
Jennie Davis Warren H Edmonds
ATTORNEYS Patented Jan. 7, 1930

1,742,593

UNITED STATES PATENT OFFICE

CHARLES TRUMAN HIBBARD, OF MINNEAPOLIS, MINNESOTA, ASSIGNOR TO ELECTRIC MACHINERY MANUFACTURING COMPANY, OF MINNEAPOLIS, MINNESOTA, A CORPORATION OF MINNESOTA

SWITCH MECHANISM FOR SYNCHRONOUS MOTOR-STARTING SYSTEMS

Application filed April 27, 1926. Serial No. 104,886.

My invention relates to starters for electric motors. To be more specific, my invention relates to starters particularly suitable for use with medium size and slow speed synchronous motors. The principal object of my invention is to provide a manually operable starter for synchronous motors, which can be operated in a manner similar to the well-known starters employed in connection with induction motors.

A common type of starter used in connection with induction motors comprises an auto-transformer and switching mechanism arranged so that the motor can be started by simply moving a hand lever from the "off" position to a starting position for the purpose of applying reduced voltage to the motor. After the motor has nearly reached its normal running speed, the hand lever is moved to a running position, thereby applying full-line voltage to the motor.

Synchronous motors are inherently more difficult to start than induction motors, and it is ordinarily considered necessary to have switching mechanism for applying voltage to the armature winding and separate, independently operated mechanism for closing the field circuit at the proper instant when the motor has practically reached synchronous speed. It is also desirable to short-circuit the field winding through a resistance during the starting period in order to avoid the generation of excessive voltage in the field winding.

The present invention was devised with a view to providing a starter for synchronous motors which can be operated as easily as the ordinary induction motor starter or compensator, and which will perform all of the operations necessary to bring a synchronous motor up to speed and connect it to the line. My improved starter can be constructed in such a manner that it reduces the dust hazard often encountered in industrial establishments to a minimum. All of the parts can be enclosed within a dust-proof and water-proof casing which protects them at all times and insures uninterrupted operation.

In general, my invention comprises a combination of switching mechanism, relays and safety devices arranged so that all of the necessary operations from connecting the field winding to a discharge resistance, applying voltage to the armature winding and ultimately supplying the excitation current can be performed by simply moving a hand lever from an "off" position to a "starting" position, and then to a "running" position; the manipulation of the starting lever being practically the same as that employed in starting an induction motor with the ordinary compensator. My improved starter is adapted to control the operation of an exciter unit and where this is done, the exciter unit and the switching mechanism are preferably arranged so that the exciter cannot be connected to the motor field winding until the motor is up to speed. My improved starter includes safety devices arranged so that either excessive current or low voltage in the exciter circuit will cause both the synchronous motor and the exciter to shut down. Furthermore, the tripping of an overload relay in the synchronous motor circuit will shut down the exciter unit.

I prefer to provide my improved starter with what may be termed a signal lock-out device which serves to prevent the starting mechanism from being moved into the full "running" position until the motor speed reaches a predetermined value near synchronous speed. This lock-out device is responsive to the electrical condition of the synchronous motor field winding during the starting period. A signal device serves to indicate the position of the locking element of the lock-out device and informs the operator when the switching mechanism is free to be moved into the full "running" position. In addition to giving a visible indication of the position of the locking element, the signal device may give an audible indication, and it may also give the operator a positive physical indication by transmitting vibrations to his hand on the starting handle.

My invention can be best understood by referring to the accompanying drawings in which I have illustrated one embodiment of the invention. In these drawings Figure 1 is a diagrammatic view of a starting system, showing the electrical connections between the motor and exciter unit and the various parts of the starting apparatus.

Figure 2 is a vertical section view of one embodiment of the signal lock-out device which I prefer to employ in conjunction with my starting system.

Figure 3 is a vertical elevation of a portion of a starter made in accordance with my invention.

Figure 4 is a diagrammatic view of a starting system similar to that shown in Figure 1, except that the connections for controlling an exciter unit are omitted.

Figure 5 is a diagrammatic view of a starting system similar to that shown in Figure 1, except that it is particularly suited to a two-phase three-wire or four-wire system.

Figure 1:
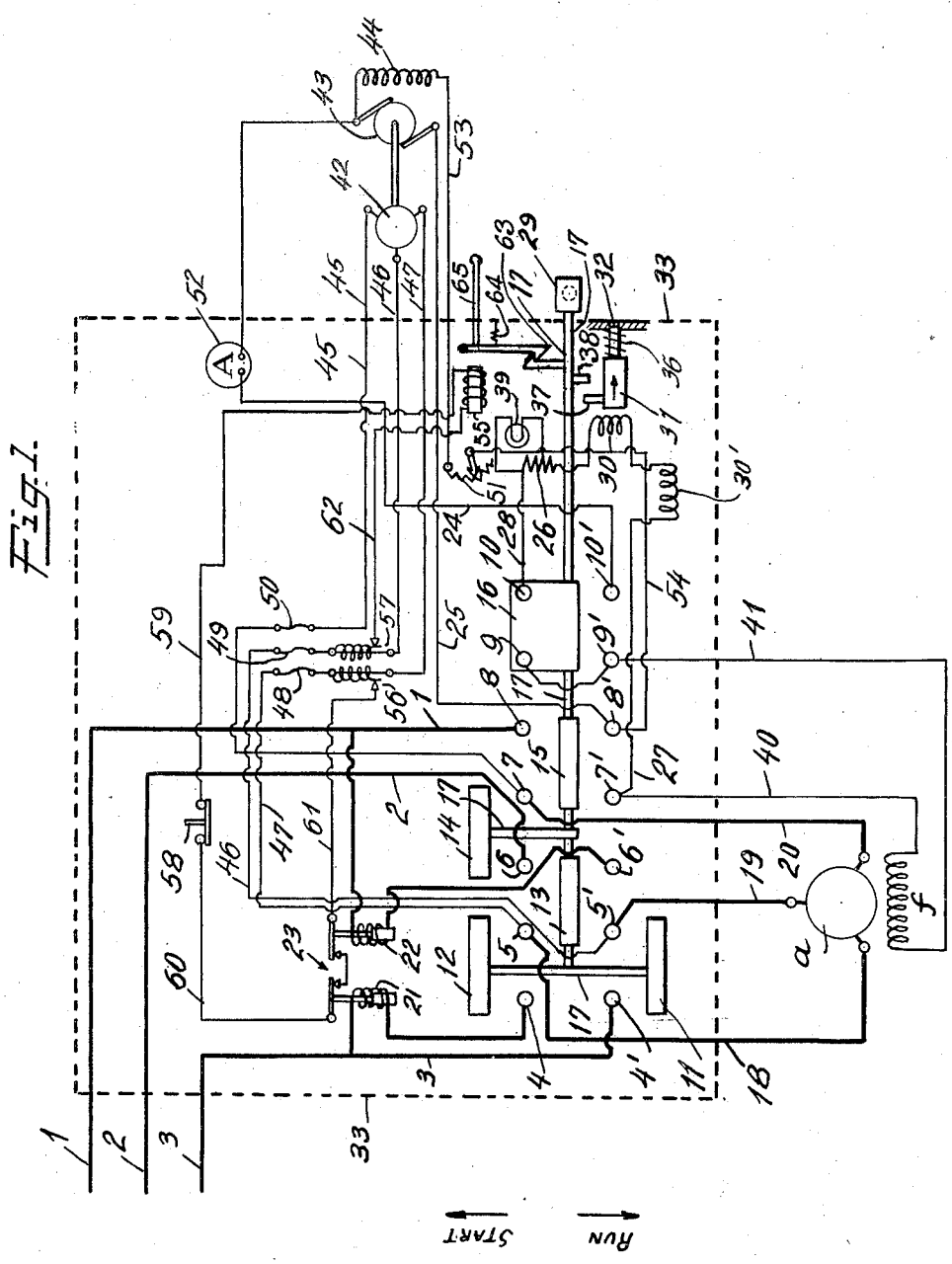

In Figure 1, I have illustrated a synchronous motor having an armature $a$ and a field winding $f$. Three leads designated 1, 2 and 3, serve to supply current to the armature winding of the motor, these leads being connected to a source of current not shown in the drawings. The switching mechanism which serves to connect the armature winding to the leads 1, 2 and 3 and to connect the field winding $f$ to a source of direct current, consists of two sets of contact fingers and a primary operating member carrying a set of contact segments adapted to engage the contact fingers. One set of contact fingers is designated by the reference numerals 4, 5, 6, 7, 8, 9, and 10, and the other set by the numerals 4′, 5′, 6′, 7′, 8′, 9′, and 10′. The contact segments are designated by the reference numerals 11, 12, 13, 14, 15, and 16. These contact segments are adapted to be moved as a unit and for that reason they are shown inter-connected by the insulating links 17. It will be understood that this representation of the manner in which the contact segments are inter-connected is wholly diagrammatic. In Figure 1, the set of contact segments is shown in the "off" position. They can be moved to a starting position as indicated by the arrow at the left of the diagram marked "Start." This causes the contact segments 13 and 15 to engage the contact fingers 5 and 6, and 7 and 8, respectively. This also brings segment 11 into contact with fingers 4′ and 5′. The set of contact segments can be moved from the "start" position to the "run" position as indicated by the arrow marked "Run" and this serves to bring segments 12 and 14 into contact with fingers 4 and 5, and 6 and 7, respectively. This movement of the contact segments brings segments 13 and 15 into contact with fingers 5′ and 6′, and 7′ and 8′, respectively, and the segment 16 is brought into contact with fingers 9′ and 10′.

It will be noted that contact segment 16 is larger than the other segments and engages contact fingers 9 and 10 even when the group of segments occupies the "off" position.

The alternating current supply leads 1, 2 and 3, are connected to contact fingers 8, 6 and 4′ respectively. The terminals of the motor armature winding are connected by means of leads 18, 19 and 20 to contact fingers 5, 5′ and 7 respectively. Contact fingers 4 and 6′ are connected to the supply leads 3 and 1 respectively through the coils 21 and 22 of an overload relay 23. Contact fingers 10′ and 8′ are connected to a source of direct current hereinafter described by means of leads 24 and 25 respectively and contact fingers 7′ and 10 are connected to a discharge resistance 26 by means of leads 27 and 28 respectively.

As stated above, the primary operating member comprising the set of contact segments 11, 12, 13, 14, 15 and 16 is shown in Figure 1 in the "off" position. When this group of segments is moved by means of the lever 29 shown in Figure 3 to the "start" position, the supply leads 1, 2 and 3 are electrically connected to the motor armature leads 20, 18 and 19 respectively. It will be noted that because of the large size of the contact segment 16, the motor field winding $f$ is connected across discharge resistance 26 before voltage is applied to the armature winding. When the group of contact segments is moved from the "start" position to the "run" position, the motor armature winding is connected to the supply leads through the overload relay 23. During the starting period, the current supplied to the armature may be greater than the current which is ordinarily required to operate the overload relay and, for this reason, it is desirable not to connect the overload relay into the armature circuit until the motor is up to speed. Moving the group of contact segments to the "run" position also serves to disconnect the motor field winding $f$ from the discharge resistance 26 and to connect this field winding to the direct current supply leads 24 and 25.

Certain precautions must be taken in establishing the running connections for a synchronous motor in the manner above described. When voltage is applied to the armature of a synchronous motor in order to start the motor, the motor comes up to speed as an induction motor. It is important that the excitation current should not be supplied to the field winding until the motor has almost reached synchronous speed. Where the starting mechanism is located at some distance from the motor, it is quite essential to have some means for indicating to the operator the moment when the motor reaches a speed close enough to synchronous speed so that the motor can be brought into step by closing the field circuit. Even where the starter is located close to the motor, it is desirable to have such an indicating means so that the operator will know when the motor has nearly reached synchronous speed. In the accompanying drawings I have illustrated a signal which is responsive to the current induced in the field winding during the starting period. When the motor approaches synchronous speed, this current falls to substantially zero and the indicator informs the operator that the field circuit should be closed. In Figure 1, I have illustrated a coil 30 connected in series with the field discharge resistance 26. An armature 31 is associated with this coil 30 and an indicating member 32 projects from one end of the armature 31. The starting mechanism is enclosed in a casing indicated diagrammatically at 33 in Figure 1 and shown at 33' in Figures 2 and 3. A small opening is provided in this casing in close proximity to the indicating member 32 and these parts are arranged so that when the armature 31 occupies one extreme position, the member 32 projects out through the opening in the casing.

The details of this signal device are clearly shown in Figures 2 and 3. This device as shown in the drawing consists of a forged steel frame 34 enclosing the coil 30. This frame may be secured to the casing 33' by any suitable means such as the bolts 35. An opening is provided in the center of this frame to receive the round steel armature 31 which forms a plunger loosely mounted in the frame. The indicating or signal member 32 may consist of a brass pin inserted in one end of the armature 31. A coil spring 36 serves to hold the armature 31 in the outer position shown in Figure 2 except when the coil 30 is energized by the induced field current. An annular recess is formed in the armature 31 around the pin 32 for the purpose of receiving the coil spring 36. This construction is desirable because it permits the inner face of the armature 31 to come in direct contact with the adjacent inner face of the steel frame 34. The frame 34 and the armature 31 form magnetic circuits threading the coil 30 and there is enough residual magnetism in this steel mass after the induced field current dies out to hold the armature 31 in its innermost position for a short period of time. A locking member 37 is secured by the outer end of the armature 31. This locking member 37 cooperates with an abutment 38 shown diagrammatically in Figure 1 in such a manner that when the armature occupies its innermost position, the locking member prevents the switching mechanism from being moved to the "run" position. The device shown in Figures 2 and 3 thus serves the double purpose of providing a visual indication of the position of the armature 31 and of preventing the switching mechanism from being moved to the "run" position until the induced field current drops to zero or, in other words, until the motor has reached a speed close to synchronous speed. If it is so desired, an incandescent lamp 39 may be connected across a portion of the discharge resistance 26 as shown in Figure 1. Such a lamp may be used as a means for informing the operator that the motor has nearly reached synchronous speed. This lamp may be used in conjunction with or in place of the indicating member 32.

The coil 30' of a suitable vibrating device can be connected in circuit with the coil 30, and this device may serve to impart mechanical vibrations to the hand of the operator or to give an audible signal or both. This coil being supplied with a current of slip frequency gives an indication proportional to the slip of the motor. This is a convenient means of informing the operator that the motor has nearly reached synchronous speed.

As stated above, the switching mechanism is adapted to connect the motor field winding $f$ to a source of direct current when the starting lever 29 (see Figure 3) is moved to the "run" position. The field winding $f$ is connected to contact fingers 7' and 9' by means of leads 40 and 41 respectively. Contact fingers 8' and 10' are connected to direct current leads 24 and 25 and the contact segments 15 and 16 are adapted to interconnect fingers 7' and 8', and 9' and 10', respectively. I prefer to construct my improved starting system so that the starter controls the connections to an exciter unit which can be used for the purpose of supplying excitation current to the motor field winding $f$. In Figure 1, I have illustrated such a unit comprising a motor 42 and a direct current generator 43 having a shunt field winding 44. Three leads 45, 46 and 47, connect the exciter motor 42 with the supply leads 18, 19 and 20 of the synchronous motor. These connections are made through the contact fingers 5, 5' and 7'. This method of connecting the motor of the small motor generator set is desirable because it prevents the supplying of current to the motor generator set until current has been supplied to the synchronous motor. Fuses 48, 49 and 50 are placed in the leads 45, 46 and 47 for the purpose of protecting the motor 42 in case excessive current is drawn by this motor from the line. A rheostat 51 is connected in series with the shunt field winding 44 of the generator 43. This rheostat is connected to the field winding 44 by means of lead 53 and to contact finger 8' by means of lead 54. An ammeter 52 is inserted in lead 24 for the purpose of indicating the current supplied to the field winding $f$ of the synchronous motor. This ammeter also serves the purpose of indicating to the operator whether the motor has been brought into step. If the pointer of the ammeter oscillates violently when the starting lever is moved to the "run" position, this indicates that the field circuit was closed at a moment when the polarity of the motor field opposed that produced by the exciting current. If this occurs and the motor fails to pull into step, the motor should be stopped and started over again.

After the starting lever 29 has been moved to the "run" position, it is held in this position by means of a latch magnet illustrated diagrammatically in Figure 1. The magnetizing coil 55 of this magnet is connected to the leads 46 and 47, between the fuses 48 and 49 and the terminals of the motor 42. Thermal overload relays 56 and 57 serve to disconnect the latch magnet coil 55 in case the motor 42 draws excessive current for a certain period of time. It will be noted that the connections are such that the current flowing through the latch magnet coil 55 will be interrupted in case either of the fuses 48 and 49 or the thermal overload relays 56 and 57 operate in response to excessive current in leads 46 and 47. This current may be interrupted by means of a push button switch 58 and the circuit is arranged so that this current is interrupted whenever the overload relays 21 and 22 in the synchronous motor armature circuit respond to excessive current in this circuit. The contacts of push button switch 58 and of the overload relays 21 and 22 and of thermal overload relays 56 and 57 are all connected in series with the latch magnet coil 55 by means of leads 59, 60, 61 and 62. The latching member 63 of the latch magnet is moved into its unlocked position by a spring 64 whenever the current flowing in the latch magnet coil 55 is interrupted. This latch may be moved to its released or unlocked position by means of the rod 65 intended to be operated by hand. The motor can be stopped by simply pulling the rod 65 to release the latch magnet, for this permits the hand lever 29 to return to its "off" position under the action of a spring or other device as shown in the drawings.

In Figure 4, I have illustrated a starter which is practically identical with that shown in Figure 1, except that the means for controlling an exciter has been omitted. The contacts 8' and 10' are simply connected to a suitable source of direct current instead of to an exciter controlled by the starter, as shown in Figure 1. In Figures 1 and 4, like parts have been designated by the same reference numerals, and accordingly the above descriptive matter relating to Figure 1 applies equally well to Figure 4, except for the exciter and associated parts.

In Figure 5, I have illustrated in diagrammatic form one application of my invention to a two-phase system. Two-phase motors may have three-wire or four-wire connections and I have shown my invention as applied to a four-wire system.

In Figure 5, I have illustrated a synchronous motor having an armature $a'$ and a field winding $f'$; four leads designated 66, 67, 68 and 69 serve to supply current to the armature winding of the motor, these leads being connected to a source of current not shown in the drawings. The switching mechanism which serves to connect the armature winding to the leads 66, 67, 68 and 69 and to connect the field winding $f$ to a source of direct current, consists of two sets of contact fingers and a primary operating member carrying a set of contact segments adapted to engage the contact fingers. One set of contact fingers is designated by the reference numerals 70, 71, 72, 73, 74, 75, 76, 77, and 78, and the other set by the numerals 70', 71', 72', 73', 74', 75', 76', 77', and 78'. The contact segments are designated by the reference numerals 79, 80, 81, 82, 83, 84, 85, and 86. These contact segments are adapted to be moved as a unit and for that reason they are shown interconnected by the insulating links 17''. It will be understood that this representation of the manner in which the contact segments are interconnected is fully diagrammatic.

In Figure 5, the set of contact segments is shown in the "off" position. These segments can be moved to a starting position, as indicated by the arrow at the left of the diagram marked "Start." This causes the contact segments 81, 82 and 86 to engage the contact fingers 71 and 72, 73 and 74, and 77 and 78, respectively. This also brings segment 80 into contact with fingers 70' and 71'. The set of contact segments can be moved from the "start" position to the "run" position, as indicated by the arrow marked "Run," and this serves to bring segments 79, 83 and 85 into contact with fingers 70 and 71, 73 and 75, and 76 and 77 respectively. This movement of the contact segments brings the segments 81, 82 and 86 into contact with fingers 71' and 72', 73' and 74', and 77' and 78', respectively. It will be noted that contact segment 84 is larger than the other segments and engages contact fingers 75' and 76', even when the group of segments occupies the "off" position.

The alternating current supply leads 76, 77, 78 and 79 are connected to contact fingers 72, 70', 76 and 73 respectively. The terminals of the motor armature winding are connected by means of leads 87, 88, 89 and 90 to contact fingers 71', 71, 74 and 77 respectively. The coils 21 and 22 of an overload relay 23 are connected between contact fingers 72 and 70, and 73 and 75, respectively. Contact fingers 78' and 73' are connected to a source of direct current hereinafter described, by means of leads 24 and 25 respectively, and contact fingers 76' and 77' are connected to a discharge resistance 26 by means of leads 27 and 28 respectively.

As stated above, the primary operating member comprising the set of contact segments is shown in Figure 5 in the "off" position. When this group of segments is moved by means of lever 29 to the "start" position, the supply leads 66, 67, 68 and 69 are electrically connected to the motor armature leads 88, 87, 90 and 89 respectively. It will be noted that because of the large size of the contact segment 84, the motor field winding f' is connected across discharge resistance 26 before voltage is applied to the armature winding. When the group of contact segments is moved from the "start" position to the "run" position, the motor winding is connected to the supply leads through the overload relay 23. In the running position, leads 66, 67, 68 and 69 are connected to the motor leads 88, 87, 90 and 89. Moving the group of contact segments to the "run" position also serves to disconnect the motor field winding f' from the discharge resistance 26 and to connect this field winding to the direct current supply leads 24 and 25.

The indicating member 32 and associated parts are shown in Figure 5. These parts have been described in detail in connection with Figure 1, and for that reason it is deemed unnecessary to describe these parts in detail in connection with Figure 5.

As stated above, the switching mechanism of Figure 5 is adapted to connect the motor field winding f' to a source of direct current when the starting lever 29 is moved to the "run" position. Field winding f' is connected to contact fingers 74' and 77' by means of leads 40 and 41 respectively. Contact fingers 73' and 78' are connected to direct current leads 25 and 24 respectively, and the contact segments 82 and 86 are adapted to interconnect fingers 73' and 74' and fingers 77' and 78', respectively.

The starter illustrated in Figure 5 is adapted to control the connections to an exciter for a two-phase motor such as that illustrated in this figure. In Figure 5, the exciter unit comprises a motor 42 and a direct current generator 43 having a shunt field winding 44. Four leads 91, 92, 93 and 94 connect the exciter motor 42 with the supply leads 90, 89, 88 and 87 respectively of the synchronous motor. These connections are made through the contact fingers 77, 74, 71 and 71'. This method of connecting the motor of the exciter unit is desirable because it prevents the supplying of current to the motor generator set until current has been supplied to the synchronous motor. Fuses 95, 96, 97 and 98 are placed in the leads 91, 92, 93 and 94 for the purpose of protecting the motor 42 in the event that excessive current is drawn by this motor from the line. A rheostat 51 is connected in series with the shunt field winding 44 of the generator 43. An ammeter 52 is inserted in line 24 for the purpose of indicating the current supplied to the field winding f' of the synchronous motor. After the starting lever 29 has been moved to the "run" position, it is held in this position by means of a latch magnet illustrated diagrammatically in Figure 5. The details of this latch magnet, which include a magnetizing coil 55, have been described in detail in connection with Figure 1. Thermal overload relays 56 and 57 serve to disconnect the latch magnet relay 55 in case the motor 52 draws excessive current for a certain period of time. Trip relays 56' and 57' are also provided in the exciter control circuit. A push button 58 is also connected in circuit in a manner similar to that described in connection with Figure 1.

It is to be understood that the various details described above may be varied without departing from the principle of my invention. For example, the switching mechanism can be used either with or without the exciter unit and the general arrangement of contact fingers and segments and of the conductors interconnecting the various parts of the system can be altered to suit varying conditions. I prefer to use the general arrangement above described because it provides a number of safety features which are valuable from a practical standpoint. The arrangement is such that the blowing of a fuse in the exciter circuit or the tripping of a thermal overload relay in this circuit will shut down both the synchronous motor and the exciter unit. Furthermore, the tripping of an overload relay in the armature circuit of the synchronous motor will shut down the exciter unit.

I claim:

1. A starter for synchronous motors, comprising the combination with a source of current, a source of excitation and a synchronous motor having an armature and a field winding, of a manually operable primary operating member movable to any one of a plurality of positions, switching mechanism connected to said member and arranged so that when said member occupies one position, the switching mechanism is adapted to connect the armature of the motor to the source of current, and so that when this member is in a second position the switch mechanism is adapted to reconnect the motor armature to said source of current and to connect the motor field winding to the source of excitation, and means responsive to the electrical condition of the motor field winding for preventing the said member from being moved to the last mentioned position until the motor speed reaches a predetermined value.

2. A starter for synchronous motors, comprising the combination with a source of current, a source of excitation and a synchronous motor having an armature and a field winding, of a primary operating member movable to any one of a plurality of positions, switching means connected to said member and arranged so that when said member occupies one position, the switching mechanism is adapted to connect the armature of the motor to said source of current, and so that when this member is in a second position the switch mechanism is adapted to connect the motor armature to said source of current and to connect the motor field winding to a source of excitation current, means responsive to the electrical condition of the motor field winding for preventing the said member from being moved to the last mentioned position until the motor speed reaches a predetermined value, and a signal actuated by said means for indicating the moment when said member can be so moved.

3. A starter for synchronous motors, comprising the combination with a source of current, a source of excitation and a synchronous motor having an armature and a field winding, of a primary operating member movable to any one of a plurality of positions, switching mechanism connected to said member and arranged so that when said member occupies one position, the switching mechanism is adapted to connect the armature of the motor to the source of current, and so that when this member is in a second position the switch mechanism is adapted to reconnect the motor armature to said source of current and to connect the motor field winding to said source of excitation, and means for mechanically locking said member against movement to the last mentioned position until the motor speed reaches a predetermined value, said means comprising a relay coil arranged to be connected in the motor field circuit during the starting period, an armature for said relay coil and a member carried by said armature and arranged to lock said primary operating member until the motor speed reaches the predetermined value.

4. A starter for synchronous motors, comprising the combination with a source of current, a source of excitation and a synchronous motor having an armature and a field winding, of a primary operating member movable to any one of a plurality of positions, switching mechanism connected to said member and arranged so that when said member occupies one position, the switching mechanism is adapted to connect the armature of the motor to said source of current, and so that when this member is in a second position the switch mechanism is adapted to connect the motor armature to said source of current, and to connect the motor field winding to said source of excitation, and means for preventing the said member from being moved to the last mentioned position until the motor speed reaches a predetermined value, said means comprising a relay coil arranged to be connected in the field circuit of the motor during the starting period, an armature for said relay coil, a member carried by said armature and arranged to lock said primary operating member until the motor speed reaches the predetermined value, and means carried by said armature for indicating the position thereof.

5. In a manually operable starter for synchronous motors, having a full running position, the combination with a synchronous motor having an armature and a field winding of means adapted to be connected to the field winding of the synchronous motor, and responsive to the electrical condition of this winding, for mechanically locking the starter against movement to the full running position until the motor speed reaches a predetermined value.

6. In a manually operable starter for synchronous motors, having a full running position, the combination with a synchronous motor having an armature and a field winding of means adapted to be connected to the field winding of the synchronous motor, and responsive to the current induced in said winding during the starting period, for mechanically locking the starter against movement to the full running position until the motor speed reaches a predetermined value.

7. In combination with a synchronous motor having a field winding, switching mechanism, a casing for said mechanism, said casing having an opening therein, and an electromagnet mounted within said casing, said electromagnet comprising a magnetizing coil adapted to be connected to the field winding of the motor during the starting period, an armature member, and a signal member connected to said armature member and arranged to project through the opening in said casing when the armature member is in one extreme position.

8. In combination with a synchronous motor having a field winding, switching mechanism, a casing for said mechanism, a lock-out magnet mounted within said casing, said magnet comprising a magnetizing coil adapted to be connected to the field winding of the motor during the starting period, an armature member, and a locking member connected to said armature member and adapted to mechanically lock said mechanism while the induced field current passes through said magnetizing coil.

9. In combination with a synchronous motor having a field winding, switching mechanism, a casing for said mechanism, said casing having an opening therein, and a lock-out magnet mounted within said casing, said magnet comprising a magnetizing coil adapted to be connected to the field winding of the motor during the starting period, an armature member, a locking member connected to said armature member and adapted to lock said mechanism while the induced field current passes through said magnetizing coil, and a signal member connected to said armature member and arranged to project through the opening in said casing when the armature member is in one extreme position.

10. A starting system comprising a synchronous motor having an armature winding and a field winding, a source of current, an excitation unit for supplying current to the field winding, switching mechanism having a running position, electrical connections arranged so that current is supplied to said exciter from said source of current only when the switching mechanism serves to supply current from said source to the armature winding of the motor, and a latch magnet for holding said switching mechanism in its running position, the coil of said magnet being connected across the input side of the exciter unit.

11. A starting system comprising a synchronous motor having an armature winding and a field winding, a source of current, an excitation unit for supplying current to the field winding, switching mechanism having a running position for connecting said motor to said source of current and to said exciter unit, a latch magnet for holding said mechanism in the running position, said latch magnet having a magnetizing coil, and electrical connections arranged so that the input side of the exciter unit is connected across the motor armature winding and the coil of the latch magnet is connected across the input side of the exciter unit.

12. A starting system comprising a synchronous motor having an armature winding and a field winding, a source of current, an excitation unit for supplying current to the field winding, switching mechanism having a running position for connecting said motor to said source of current and to said exciter unit, a latch magnet for holding said mechanism in the running position, said latch magnet having a magnetizing coil, electrical connections arranged so that the input side of the exciter unit is connected across the motor armature winding and the coil of the latch magnet is connected across the input side of the exciter unit; an overload relay responsive to excessive current in the motor armature winding and having contacts in series with the latch magnet coil, and a thermal overload relay connected in circuit to the input side of the exciter unit and having contacts in series with the latch magnet coil.

13. A starting system comprising a synchronous motor having an armature winding and a field winding, a source of current, an excitation unit for supplying current to the field winding, switching mechanism having a running position for connecting said motor to said source of current and to said exciter unit, a latch magnet for holding said mechanism in the running position, said latch magnet having a magnetizing coil, electrical connections arranged so that the input side of the exciter unit is connected across the motor armature winding and the coil of the latch magnet is connected across the input side of the exciter unit; an overload relay responsive to excessive current in the motor armature winding and having contacts in series with the latch magnet coil, a thermal overload relay connected in circuit with the input side of the exciter unit and having contacts in series with the latch magnet coil, and a fuse connected in circuit with the input side of the exciter unit, between the thermal overload relay and the source of current.

In testimony whereof I affix my signature.
CHARLES TRUMAN HIBBARD.